United States Patent Office 3,338,924
Patented Aug. 29, 1967

3,338,924
PURIFICATION OF CRUDE PHTHALIC
ANHYDRIDE
Siegried Meinstein, Oak Lawn, Ill., assignor to Witco Chemical Company, Inc., New York, N.Y., a corporation of Delaware
No Drawing. Filed Mar. 30, 1965, Ser. No. 444,062
7 Claims. (Cl. 260—346.7)

My invention relates to the purification of crude phthalic anhydride and it is especially concerned with an improved method for the purification of crude phthalic anhydride derived from the vapor phase oxidation of ortho-xylene.

Numerous methods have been suggested, and various of them have been commercially employed, for purifying crude phthalic anhydride. These prior methods include, by way of illustration, refluxing the crude phthalic anhydride with small amounts of ammonium acid sulfate or with lithium nitrate or with sodium bisulfite at elevated temperatures. Another of such known procedures involves a two step operation in which, in the first step, the crude phthalic anhydride, whether produced by oxidation of naphthalene or ortho-xylene, is treated with an oxidizing agent, such as sulfuric acid or hydrogen peroxide, at temperatures above 270 degrees C., and in which, in the second step, is treated with an alkali metal nitrate, also at temperatures above 270 degrees C. Such procedures, while reasonably effective, generally speaking, possess one or more of a number of disadvantages, or combinations of disadvantages, in relation to the over-all quality of the refined or purified phthalic anhydride obtained, amounts of tarry formation products, and yields of the refined or purified phthalic anhydride.

My invention, particularly when carried out under optimum conditions, results in significant improvements with respect to overcoming one or more of the foregoing deficiencies of heretofore known procedures for purification of crude phthalic anhydride. My invention is particularly important in connection with the purification of crude phthalic anhydride derived from the vapor phase oxidation of ortho-xylene. Illustrative crude phthalic anhydrides prepared by the vapor phase oxidation of ortho-xylene in the presence of typical oxidation catalysts have the following analyses:

|  | Sample A, wt. percent | Sample B, wt. percent |
|---|---|---|
| Phthalic Anhydride | 97.2 | 95.3 |
| Maleic Anhydride | 0.96 | 1.12 |
| Citraconic Acid | 0.23 | 0.26 |
| Benzoic Acid | 0.02 | 0.05 |
| Toluic Acid |  | 0.04 |
| Phthalide | 0.34 | 2.74 |
| O-Tolualdehyde | Trace | 0.26 |
| Benzaldehyde | 0.03 | 0.01 |
| Unidentified Non-Acid Materials |  | 0.18 |

Such crude phthalic anhydrides have been found to be much more refractory to purification procedures than crude phthalic anhydrides produced by the vapor phase oxidation of naphthalene. This is presumably due to the presence in the ortho-xylene derived crude phthalic anhydride of certain types of impurities, and/or proportions thereof, which are not present in crude phthalic anhydrides derived from naphthalene sources. The present invention, therefore, has its most significant value in the purification of crude phthalic anhydride prepared from ortho-xylene. It is also of marked advantage in the purification of crude phthalic anhydrides prepared by the vapor phase oxidation of mixtures of ortho-xylene and naphthalene, particularly where the ortho-xylene content of said mixtures is of the order of at least 25%, by weight, and, better still, of the order of 50% or more of ortho-xylene. The invention, to be sure, is also applicable to the purification of crude phthalic anhydride derived from other sources, such as the oxidation or vapor phase oxidation of naphthalene alone, but it is of lesser advantage as to such phthalic anhydride crudes because other presently known methods of purifying naphthalene derived phthalic anhydride produce reasonably satisfactory purified products. However, as indicated, in the broader aspects of my invention, my novel method of purification is applicable to the treatment of crude phthalic anhydride (which also includes so-called semi-refined phthalic anhydride) independently of the manner in which the same may have been produced.

Briefly stated, my method of refining or purifying crude phthalic anhydride comprises providing a mixture of the crude phthalic anhydride, in molten form, with small proportions of (1) at least one member of the group of organic peroxides, hydrogen peroxide, and alkali metal peroxides, and small proportions of (2) at least one member selected from the group consisting of alkali metal hydroxides, alkali metal carbonates, and alkali metal bicarbonates, heating said mixture for several hours at elevated temperatures, generally above 270 degrees C. but not substantially in excess of the boiling point of phthalic anhydride at atmospheric pressure. The refined or purified phthalic anhydride is recovered by distillation from the mixture under a pressure below atmospheric pressure or, in other words, by fractional distillation under conditions of vacuum or subatmospheric pressure.

The peroxides which are useful in the broader aspects of the practice of the prevent invention comprise organic peroxides (which also include hydroperoxides), hydrogen peroxide, and alkali metal peroxides or mixtures of two or more thereof. These include, by way of specific illustrative examples, benzoyl peroxide, lauroyl peroxide, myristoyl peroxide, cumene hydroperoxide, sodium peroxide, potassium peroxide and lithium peroxide. Such peroxides, for instance, as sodium peroxide and cumene hydroperoxide, are somewhat difficult to handle since, in use, they cause effervescence of a substantial magnitude and, therefore, do not lend themselves well to plant scale operations. Moreover, the organic peroxides do not produce optimum results from the standpoint of over-all quality or yield of the purified phthalic anhydride. Because of reasons of economy, and, more importantly, because of ease and safety of handling, and optimum results with respect to excellence of quality and high yields of purified phthalic anhydride, the use of hydrogen peroxide (in conjunction with alkali metal hydroxides, carbonates or bicarbonates) is especially advantageous and its use, in the environment of the present invention, represents the particularly important embodiment of the invention. The hydrogen peroxide, for ease of operation, is employed in the form of relatively strong aqueous solutions, aqueous 30 to 35% hydrogen peroxide being very desirable. The proportions of the peroxides employed are, in all cases, quite small being, at least in part, dependent upon the selection of the particular peroxide and the content and nature of the impurities present in the crude phthalic anhydride to be treated. In general, the proportions of the peroxide should be appreciably below 1%, based on the weight of the crude phthalic anhydride, and will generally be below 0.5%, usually in the range of 0.1% to 0.3%. In the case of hydrogen peroxide, the optimum proportions, in the usual case, will be found to be in the range of substantially 0.15% to 0.25%, calculated on the basis of 100% hydrogen peroxide.

As stated above, the aforesaid peroxides are used, pursuant to the present invention, in conjunction with alkali metal hydroxides, alkali metal carbonates, or alkali metal bicarbonates, illustrative examples of which are sodium hydroxide, potassium hydroxide, lithium hydroxide, sodium carbonate, potassium carbonate, lithium carbonate and sodium bicarbonate, and mixtures of two or more thereof. Sodium carbonate is especially satisfactory and its use, in conjunction with hydrogen peroxide, represents the most important embodiment of the invention. The proportions of the alkali metal hydroxides, carbonates and bicarbonates utilized will also, in all cases, be quite small, and will, generally speaking, be very considerably less than the proportions of the peroxides. In the usual case, the proportions thereof will fall within the range of about 0.01% to about 0.5% by weight of the crude phthalic anhydride. In the case of sodium carbonate, the optimum proportions will usually be found to lie within the range of 0.015% to 0.03% with a good average being substantially 0.02%, particularly where the sodium carbonate is used in conjunction with hydrogen peroxide.

The temperature of treatment, as stated previously, is, generally speaking, above 270 degrees C. and advantageously at about the boiling point of phthalic anhydride at atmospheric pressure which is approximately 285 degrees C. The treatment time, as stated, is several hours, with an optimum time, in the usual case, where the temperature utilized is about 285 degrees C., of about 8 to 10 hours. Generally speaking, for best results the treatment time should be more than 5 hours and ordinarily should not exceed 12 hours. A range of about 7 to 10 hours will usually be found to be very satisfactory. The treatment will, in general, be conducted under reflux.

The following tables show the results of typical examples of the practice of the present invention, it being understood that said examples are illustrative of and not limitative of the present invention. In all instances, the examples were carried out by utilizing 1000 g. of the crude phthalic anhydride, with recycled forecut and residue from previous distillations having been added as specifically indicated (the forecut being added prior to, and the residue after, the heat treatment), the crude phthalic anhydride being provided in molten form at a temperature of 140 degrees C. to 150 degrees C., the peroxide employed being aqueous 30% hydrogen peroxide and being injected into said molten crude phthalic anhydride beneath the surface thereof. The mixtures were heated for 10 hours, except as otherwise noted, at a temperature of 285 degrees C. under reflux. Distillations were carried out under vacuum, forecut being collected at 95 mm.–100 mm. with a 15/1 reflux ratio and heart-cut at 75 mm.–80 mm. with a 3/1 reflux ratio, the still flask temperature being maintained at 215 degrees C. to 220 degrees C.

TABLE I.—PURIFICATION OF 100% ORTHO-XYLENE DERIVED CRUDE PHTHALIC ANHYDRIDE (PAA)

| | Treating Additive | Treating Time (hrs.) | Quality of Refined PAA | | | | Percent Yield | | |
|---|---|---|---|---|---|---|---|---|---|
| | | | Color | Heat Stability | S.P. (° C.) | T.A. (percent) | Forecut | Heartcut | Residue |
| 1 | None* | 10 | 10 | 100 | 131.0 | 99.9 | 5.0 | 90.0 | 5.0 |
| 2 | ____do____ | 10 | 10 | 70 | 131.0 | 99.9 | 7.0 | 89.0 | 4.0 |
| 3 | 0.2% $H_2O_2$ and 0.02% $Na_2CO_3$* | 10 | 10 | 10. | 131.1 | 100.0 | 6.0 | 90.0 | 4.0 |
| 4 | 0.2% $H_2O_2$ and 0.02% $Na_2CO_3$ | 10 | 10 | 30 | 131.1 | 99.9 | 6.0 | 88.0 | 6.0 |
| 5 | 0.2% $H_2O_2$ and 0.02% $Na_2CO_3$ | 10 | 10 | 10 | 131.2 | 100.0 | 5.0 | 87.0 | 8.0 |
| 6 | 0.2% $H_2O_2$ and 0.02% $Na_2CO_3$ | 10 | 10 | 10 | 131.2 | 100.0 | 8.0 | 88.0 | 4.0 |
| 7 | 0.2% $H_2O_2$ and 0.02% $Na_2CO_3$ | 10 | 10 | 10 | 131.1 | 100.0 | 8.0 | 87.0 | 5.0 |
| 8 | 0.2% $H_2O_2$ and 0.02% $Na_2CO_3$ | 10 | 10 | 10 | 131.2 | 100.0 | 4.0 | 94.0 | 2.0 |
| 9 | 0.2% $H_2O_2$ and 0.02% $Na_2CO_3$ | 10 | 10 | 10 | 131.2 | 100.0 | 2.0 | 93.0 | 5.0 |
| 10 | 0.2% $H_2O_2$ and 0.02% $Na_2CO_3$ | 10 | 10 | 10 | 131.1 | 100.0 | 3.0 | 94.0 | 3.0 |
| 11 | 0.2% $H_2O_2$ and 0.02% $Na_2CO_3$ | 10 | 10 | 10 | 131.2 | 100.0 | 4.0 | 95.0 | 1.0 |
| 12 | 0.2% $H_2O_2$ and 0.02% $Na_2CO_3$ | 8 | 10 | 30 | 131.1 | 99.9 | 3.0 | 91.0 | 6.0 |

* Neither recycle forecut nor previous residue was used; in all other cases, such fractions were employed.

TABLE II.—REFINING OF CRUDE PAA PRODUCED FROM ORTHO-XYLENE

| | Treating Additive | Percent Crude PAA from Naphthalene Conversion added | Quality of Refined PAA | | | | Percent Yield | | |
|---|---|---|---|---|---|---|---|---|---|
| | | | Color | Heat Stability | S.P. (° C.) | T.A. (percent) | Forecut | Heartcut | Residue |
| 1 | None | 50 | 10 | 50 | 130.9 | 99.9 | 4.0 | 85.0 | 11.0 |
| 2 | ____do____ | 50 | 10 | 40 | 130.9 | 99.9 | 7.0 | 78.0 | 15.0 |
| 3 | 0.2% $H_2O_2$ and 0.02% $Na_2CO_3$* | 50 | 10 | 30 | 131.0 | 99.9 | 8.0 | 85.0 | 7.0 |
| 4 | 0.2% $H_2O_2$ and 0.02% $Na_2CO_3$* | 50 | 10 | 10 | 131.1 | 99.9 | 8.0 | 85.0 | 7.0 |
| 5 | 0.2% $H_2O_2$ and 0.02% $Na_2CO_3$* | None | 10 | 10 | 131.2 | 99.9 | 7.0 | 88.0 | 5.0 |

*Samples did not contain recycled forecut, nor residues from previous distillations; all others did contain these.

TABLE III.—REFINING OF 50/50 MIXTURES OF CRUDE PAA FROM ORTHO-XYLENE AND NAPHTHALENE CONVERSIONS

| | Treating Additive | Treating Time (hrs.) | Quality of Refined PAA | | | | Percent Yield | | |
|---|---|---|---|---|---|---|---|---|---|
| | | | Color | Heat Stability | S.P. (° C.) | T.A. (percent) | Forecut | Heartcut | Residue |
| 1 | None | 10 | 10 | 10 | 130.8 | 99.9 | 5.0 | 87.0 | 8.0 |
| 2 | ____do____ | 8 | 10 | 30 | 131.0 | 99.6 | 3.0 | 87.0 | 10.0 |
| 3 | 0.2% $H_2O_2$ and 0.02% $Na_2CO_3$ * | 10 | 10 | 10 | 131.1 | 100.0 | 4.0 | 89.0 | 7.0 |
| 4 | 0.2% $H_2O_2$ and 0.02% $Na_2CO_3$ * | 8 | 10 | 10 | 131.2 | 99.9 | 5.0 | 89.0 | 6.0 |
| 5 | 0.2% $H_2O_2$ and 0.02% $Na_2CO_3$ * | 8 | 10 | 10 | 131.2 | 99.8 | 4.0 | 88.0 | 8.0 |
| 6 | 0.2% $H_2O_2$ and 0.02% $Na_2CO_3$ * | 8 | 10 | 10 | 131.0 | 99.5 | 3.0 | 89.0 | 8.0 |

* Samples did contain recycle forecut, but were not distilled with previous residue; all others contained both, recycle forecut and distillation residues from preceding distillations.

TABLE IV

| | Treating Additive | Percent Recycled | | Quality of Refined PAA | | | | Percent Yield | | |
|---|---|---|---|---|---|---|---|---|---|---|
| | | Forecut | Residue | Color | Heat Stability | S.P. (° C.) | T.A. (Percent) | Forecut | Heartcut | Residue |
| 1 | 0.2% $H_2O_2$ and 0.02% $K_2CO_3$ | ---------- | ---------- | 10 | 10 | 131.1 | 99.8 | 7 | 86 | 6 |
| 2 | 0.2% $H_2O_2$ and 0.02% $K_2CO_3$ | 7.0 | 6.0 | 10 | 30 | 130.9 | 99.7 | 6 | 87 | 7 |
| 3 | 0.2% $H_2O_2$ and 0.02% $K_2CO_3$ | 6.0 | 7.0 | 10 | 10 | 131.1 | 99.8 | 6 | 88 | 6 |
| 4 | 0.2% $H_2O_2$ and 0.02% $K_2CO_3$ | 7.0 | 5.0 | 10 | 15 | 131.1 | 99.8 | 6 | 87 | 6 |
| 5 | 0.2% $H_2O_2$ and 0.02% $K_2CO_3$ | 6.0 | 6.0 | 10 | 20 | 131.1 | 99.6 | 8 | 86 | 6 |

The practice of the method of the present invention enables the production of high over-all quality of refined or purified phthalic anhydride, particularly from ortho-xylene derived sources, with reduced formation of tars and with excellent refinery yields. Distillations run smoothly and reflux ratios can be lowered in many cases, for instance, to 3/1 or 1/1, or, in some cases, even to 1/2 without adverse effect on the quality of the purified phthalic anhydride obtained. In addition to the quality values shown in the foregoing tables, 24 hour ultraviolet (Weather-O-Meter) tests have shown superior ratings (zero—no color change) for purified phthalic anhydrides produced pursuant to the present invention. Additional advantageous features which have been noted are the essential absence of destruction of phthalic anhydride in the treating process, and low viscosities of the residues, e.g. at 35% TA, and, even at 28%, residues have been found to be readily pourable.

What I claim as new and desire to protect by Letters Patent of the United States is:

1. A method of purifying crude phthalic anhydride which comprises admixing therewith small proportions if (1) at least one member selected from the group consisting of organic peroxides, hydrogen peroxide, and alkali metal peroxides, said organic peroxides being selected from the group consisting of benzoyl peroxide, lauroyl peroxide, myristoyl peroxide and cumene hydroperoxide. and small proportions of (2) at least one member selected from the group consisting of alkali metal hydroxides and alkali metal carbonates and bicarbonates, heating said mixture at a temperature above 270 degrees C. for several hours, and then recovering purified phthalic anhydride by distillation.

2. A method of purifying crude phthalic anhydride which comprises admixing therewith small proportions of hydrogen peroxide and sodium carbonate, heating said mixture at a temperature of about 285 degrees C. under reflux for from about 7 to 10 hours, and then recovering purified phthalic anhydride by distillation under a pressure below atmospheric pressure.

3. A method of purifying crude phthalic anhydride which comprises admixing therewith from about 0.15% to 0.25% hydrogen peroxide and from about 0.015% to 0.03% of sodium carbonate, by weight of said anhydride, heating said mixture at a temperature of about 285 degrees C. under reflux for from about 7 to 10 hours, and then recovering purified phthalic anhydride by distillation under a pressure below atmospheric pressure.

4. A method of purifying crude phthalic anhydride derived from the vapor phase oxidation of ortho-xylene which comprises admixing said crude anhydride with small proportions of (1) at least one member selected from the group consisting of organic peroxides, hydrogen peroxide, and alkali metal peroxides, said organic peroxides being selected from the group consisting of benzoyl peroxide, lauroyl peroxide, myristoyl peroxide and cumene hydroperoxide, and small proportions of (2) at least one member selected from the group consisting of alkali metal hydroxides and alkali metal carbonates and bicarbonates, heating said mixture at a temperature above 270 degrees C. under reflux for several hours, and then recovering purified phthalic anhydride by distillation under a pressure below atmospheric pressure.

5. A method of purifying crude phthalic anhydride derived from the vapor phase oxidation of ortho-xylene which comprises providing said crude phthalic anhydride in molten form to which there is added small proportions of hydrogen peroxide and sodium carbonate, heating said mixture at a temperature above 270 degrees C. for several hours, and then recovering purified phthalic anhydride by distillation under a pressure below atmospheric pressure.

6. A method of purifying crude phthalic anhydride derived from the vapor phase oxidation of ortho-xylene and mixtures of ortho-xylene and naphthalene, which comprises providing said crude phthalic anhydride in molten form to which there is added aqueous hydrogen peroxide and sodium carbonate in small proportions, heating said mixture at about 285 degrees C. for a period of about 7 to about 10 hours under reflux, and then recovering purified phthalic anhydride by distillation under a pressure below atmospheric pressure.

7. A method of purifying crude phthalic anhydride derived from the vapor phase oxidation of ortho-xylene and mixtures of ortho-xylene and naphthalene in which the ortho-xylene constitutes at least 25% by weight of the mixtures, which comprises providing said crude phthalic anhydride in molten form to which there is added aqueous 30 to 35% hydrogen peroxide and sodium carbonate in proportions, by weight of said crude anhydride, of substantially 0.15% to 0.25% as hydrogen peroxide and of substantially 0.02% sodium carbonate, heating said mixture at about 285 degrees C. for a period of about 7 to about 10 hours under reflux, and then recovering purified phthalic anhydride by distillation under a pressure below atmospheric pressure and at a temperature within the range of about 215 degrees C. to 220 degrees C.

References Cited

UNITED STATES PATENTS 2,309,167  1/1943  Cooper _____ 260—346.7
2,511,861  6/1950  Marotta _____ 260—346.7

NICHOLAS S. RIZZO, *Primary Examiner.*